US012801721B2

(12) United States Patent
Sali et al.

(10) Patent No.: US 12,801,721 B2
(45) Date of Patent: Nov. 17, 2026

(54) SYSTEM AND METHOD FOR DATA RESEARCH, ANALYTICS, AND MODELING ENGINE

(71) Applicant: JPMorgan Chase Bank, N.A., New York, NY (US)

(72) Inventors: Rekha Sali, Metuchen, NJ (US); Ray Wangneo, Wilton, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 15 days.

(21) Appl. No.: 19/182,261

(22) Filed: Apr. 17, 2025

(65) Prior Publication Data

US 2025/0328629 A1 Oct. 23, 2025

Related U.S. Application Data

(60) Provisional application No. 63/637,588, filed on Apr. 23, 2024.

(51) Int. Cl.
*G06F 21/44* (2013.01)
*G06N 20/00* (2019.01)

(52) U.S. Cl.
CPC ............ *G06F 21/44* (2013.01); *G06N 20/00* (2019.01)

(58) Field of Classification Search
CPC ................................ G06F 21/44; G06N 20/00
See application file for complete search history.

(56) References Cited

U.S. PATENT DOCUMENTS

| | | | | |
|---|---|---|---|---|
| 10,824,948 B2 * | 11/2020 | Nelson | ................ | H04L 41/5054 |
| 11,405,451 B2 * | 8/2022 | Pinheiro | ................ | G06N 20/00 |
| 11,948,003 B2 * | 4/2024 | Nandakumar | ............ | G06F 8/10 |
| 12,135,732 B1 * | 11/2024 | Yao | ..................... | G06F 16/2457 |
| 2025/0131492 A1 * | 4/2025 | Manges | ................ | G06F 16/254 |

* cited by examiner

*Primary Examiner* — Han Yang
(74) *Attorney, Agent, or Firm* — GREENBLUM & BERNSTEIN, P.L.C.

(57) ABSTRACT

Various methods and processes, apparatuses or systems, and media for automating development, testing, and productionizing a pipeline for users are disclosed. A processor receives a request from a user to access an application, the request including user's credentials data; grants access to the application based on verifying the user's credentials data with prestored credentials data received by calling an authentication server; identifies the user's role within a computing environment; automatically presents a template that corresponds to the user's role allowing the user to write code to source data either by bringing the user's own data into the computing environment or by connecting to data that resides in a database; automatically integrates the written code with a continuous integration continuous delivery pipeline for production of a model; and deploys the model after training and testing the model while managing and maintaining all necessary guardrails from a control standpoint within the computing environment.

20 Claims, 6 Drawing Sheets

300

500

600

SYSTEM AND METHOD FOR DATA RESEARCH, ANALYTICS, AND MODELING ENGINE

CROSS REFERENCE TO RELATED APPLICATIONS

This application claims the benefit of priority from U.S. Provisional Patent Application No. 63/637,588, filed Apr. 23, 2024, which is herein incorporated by reference in its entirety.

TECHNICAL FIELD

This disclosure generally relates to data processing, and, more particularly, to methods and apparatuses for implementing a platform, language, cloud, and database agnostic data research, analytics, and modeling module configured to create one platform for end-to-end modeling for applications.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, data management, and competitive analysis, to name but a few.

Moreover, across the multiple lines of businesses (LOB) at an organization, application developers are constantly faced with a daunting task of developing, testing, and deploying new applications for improving customer experience as well as productivity. As software applications become increasingly more complex, checking out the code, building, testing, and deploying such software applications also become more complex as a large number of unique combinations of paths and modules may be tested for each program. While conventional deployment and operational engines may help address some of the problem, one may still find that the deployment and operational focus required may be challenged at times based on other functional delivery priorities and operations experiences.

For example, for data research and analytics for financial applications, an end user typically writes python code on the user's sandbox. Then the end user hands that python code via email or share drive to a tech team. The tech team then takes that python code and rewrites the entire python code for productionizing which is inefficient and time consuming.

However, conventional tools do not provide one platform for end-to-end modeling for applications (e.g., financial applications) considering the regulatory constraints. Moreover, conventional tools lack the configurations for managing and organizing data and data pipeline from a single platform.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic research, analytics, and modeling module configured to create one platform for end-to-end modeling for financial applications, thereby automating the development, testing, and productionizing pipeline for business users while managing and maintaining all necessary guardrails from a control standpoint within a computing environment, but the disclosure is not limited thereto.

For example, the research, analytics, and modeling module is configured to create a light-weight wrapper that includes a set of intuitive and self-service analytics and modeling capabilities with simplified deployment workflows requiring low touch technology team interaction without compromising on controls and governance, but the disclosure is not limited thereto. A wrapper is a function or a subroutine in a software library or a computer program whose main purpose is to call a second subroutine or a system call with little or no additional computation.

According to exemplary embodiments, the wrapper disclosed herein may utilize Databricks as the execution platform to handle end to end modeling for all phases of the model lifecycle. Thus, the research, analytics, and modeling module provides a control framework around core Databricks capabilities and enables: simple and seamless onboarding experience; automation of optimized infrastructure creation with pre built libraries including but not limited to on demand cluster creation with minimal inputs to provision tailor made compute types that are size optimized; access to run Python/SQL scripts on production data; ability to bring or build own dataset; ability to create simple visualizations and collaborate; ability to share and catalog models; self-orchestration and promotion of code to production with controls; maintenance of granular metadata for full lineage and traceability of user and system actions, etc., but the disclosure is not limited thereto.

According to exemplary embodiments, a method for automating development, testing, and productionizing a pipeline for users by utilizing one or more processors along with allocated memory is disclosed. The method may include: receiving a request from a user to access an application, the request including user's credentials data; granting access to the application based on verifying the user's credentials data with prestored credentials data received by calling an authentication server via corresponding application programming interface; identifying the user's role within a computing environment;

automatically presenting a template that corresponds to the user's role allowing the user to write code to source data either by bringing the user's own data into the computing environment or by connecting to data that resides in a database; automatically integrating the written code with a continuous integration continuous delivery pipeline for production of a model; and deploying the model after training and testing the model while managing and maintaining all necessary guardrails from a control standpoint within the computing environment.

According to exemplary embodiments, the method may further include: dynamically creating user interface along with user's inputs.

According to exemplary embodiments, the user's role may include one or more of the following: data analysts, business developer, statistical modeler, machine learning engineer, data scientist, but the disclosure is not limited thereto.

According to exemplary embodiments, the computing environment may be a combination of a public cloud environment and a private cloud environment.

According to exemplary embodiments, the method may further include: implementing the model to support regulatory, audit, finance, strategy, and risk management processes.

According to exemplary embodiments, the method may further include: receiving user inputs to configure and customize run execution screen for deployed code.

According to exemplary embodiments, the model may be a machine learning model.

According to exemplary embodiments, a system for automating development, testing, and productionizing a pipeline for users is disclosed. The system may include: a processor; and a memory operatively connected to the processor via a communication interface, the memory storing computer readable instructions, when executed, may cause the processor to: receive a request from a user to access an application, the request including user's credentials data; grant access to the application based on verifying the user's credentials data with prestored credentials data received by calling an authentication server via corresponding application programming interface; identify the user's role within a computing environment; automatically present a template that corresponds to the user's role allowing the user to write code to source data either by bringing the user's own data into the computing environment or by connecting to data that resides in a database; automatically integrate the written code with a continuous integration continuous delivery pipeline for production of a model; and deploy the model after training and testing the model while managing and maintaining all necessary guardrails from a control standpoint within the computing environment.

According to exemplary embodiments of the system, the processor may be further configured to dynamically create user interface along with user's inputs.

According to exemplary embodiments of the system, the user's role may include one or more of the following: data analysts, business developer, statistical modeler, machine learning engineer, data scientist, but the disclosure is not limited thereto.

According to exemplary embodiments of the system, the computing environment may be a combination of a public cloud environment and a private cloud environment.

According to exemplary embodiments of the system, the processor may be further configured to implement the model to support regulatory, audit, finance, strategy, and risk management processes.

According to exemplary embodiments of the system, the processor may be further configured to receive user inputs to configure and customize run execution screen for deployed code.

According to exemplary embodiments of the system, the model may be a machine learning model.

According to exemplary embodiments, a non-transitory computer readable medium configured to store instructions for automating development, testing, and productionizing a pipeline for users is disclosed. The instructions, when executed, may cause a processor to perform the following: receiving a request from a user to access an application, the request including user's credentials data; granting access to the application based on verifying the user's credentials data with prestored credentials data received by calling an authentication server via corresponding application programming interface; identifying the user's role within a computing environment; automatically presenting a template that corresponds to the user's role allowing the user to write code to source data either by bringing the user's own data into the computing environment or by connecting to data that resides in a database; automatically integrating the written code with a continuous integration continuous delivery pipeline for production of a model; and deploying the model after training and testing the model while managing and maintaining all necessary guardrails from a control standpoint within the computing environment.

According to exemplary embodiments of the non-transitory computer readable medium, the instructions, when executed, may cause the processor to further perform the following: dynamically creating user interface along with user's inputs.

According to exemplary embodiments of the non-transitory computer readable medium, the user's role may include one or more of the following: data analysts, business developer, statistical modeler, machine learning engineer, data scientist, but the disclosure is not limited thereto.

According to exemplary embodiments of the non-transitory computer readable medium, the computing environment may be a combination of a public cloud environment and a private cloud environment.

According to exemplary embodiments of the non-transitory computer readable medium, the instructions, when executed, may cause the processor to further perform the following: implementing the model to support regulatory, audit, finance, strategy, and risk management processes.

According to exemplary embodiments of the non-transitory computer readable medium, the instructions, when executed, may cause the processor to further perform the following: receiving user inputs to configure and customize run execution screen for deployed code.

According to exemplary embodiments of the non-transitory computer readable medium, the model may be a machine learning model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
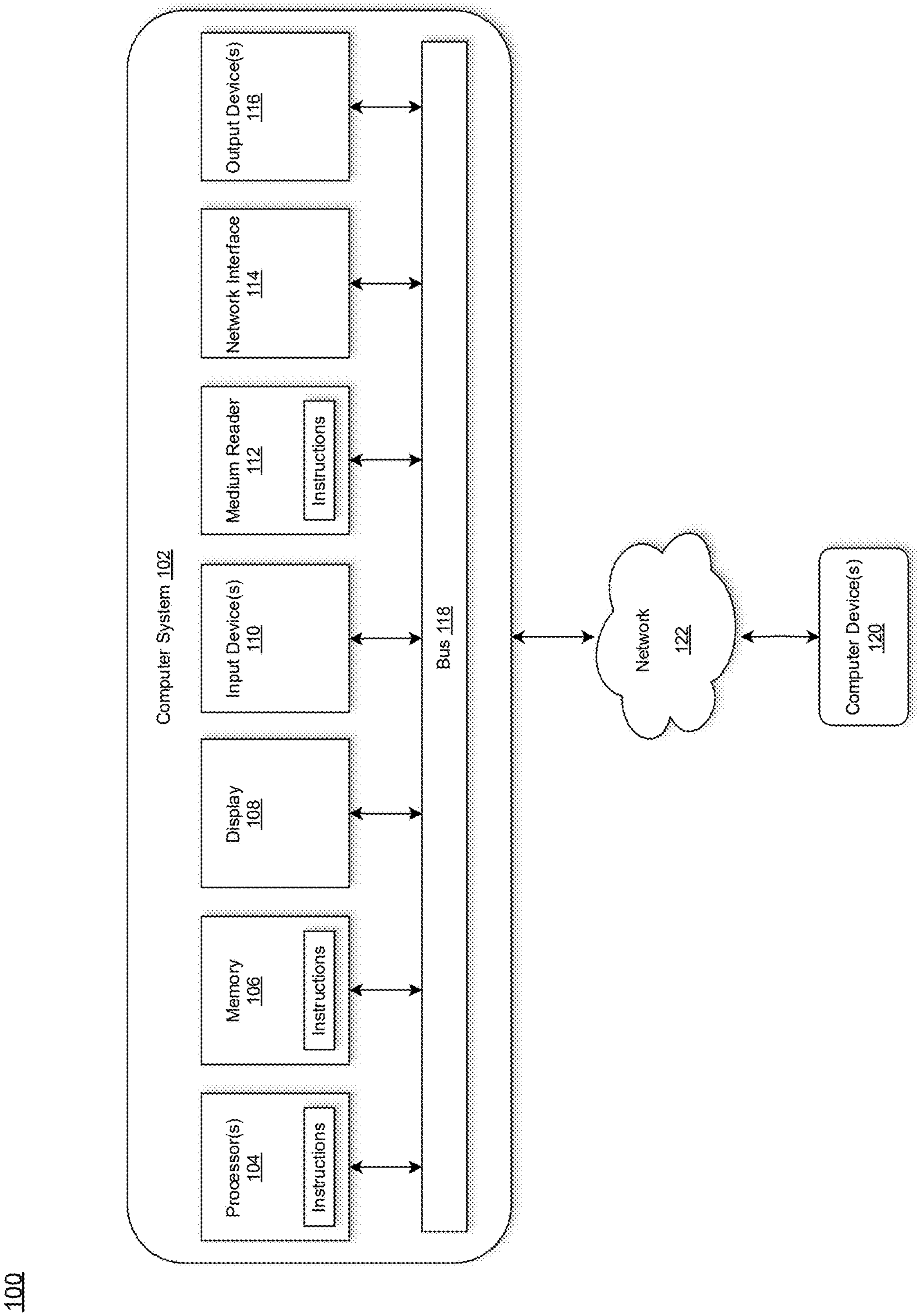
FIG. 1 illustrates a computer system for implementing a platform, language, database, and cloud agnostic research, analytics, and modeling module configured to create one platform for end-to-end modeling for financial applications in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As mentioned earlier, as software applications become increasingly more complex, checking out the code, building, testing, and deploying such software applications also become more complex as a large number of unique combinations of paths and modules may be tested for each program. While conventional deployment and operational engines may help address some of the problem, one may still find that the deployment and operational focus required may be challenged at times based on other functional delivery priorities and operations experiences.

For example, for data research and analytics for financial applications, an end user typically writes python code on the user's sandbox. Then the end user hands that python code via email or share drive to a tech team. The tech team then takes that python code and rewrites the entire python code for productionizing which is inefficient and time consuming.

However, conventional tools do not provide one platform for end-to-end modeling for applications (e.g., financial applications) considering the regulatory constraints. Moreover, conventional tools lack the configurations for managing and organizing data and data pipeline from a single platform.

Moreover, distributing large volumes of data is a key challenge for computing and information systems of any appreciable scale. The exemplary embodiments of the invention disclosed herein apply to a vast spectrum of applications that would benefit from low-latency delivery of large volumes of data to multiple data consumers. These embodiments fundamentally address the practical problems of distributing such data over bandwidth-limited communication channels to compute-limited data consumers. This problem is particularly acute in connection with real-time data. Real-time data distribution systems must contend with these physical limits when the real-time data rates exceed the ability of the communication channel to transfer the data and/or the ability of the data consumers to consume the data. Furthermore, the distribution of real-time financial market data to applications such as trading, risk monitoring, order routing, and matching engines represents one of the most demanding contemporary use cases. While many of the exemplary embodiments discussed herein focus on applications in the financial markets, it should be understood that the technology described herein may be applied to a wide variety of other application domains.

Thus, to address these conventional shortcomings, exemplary embodiments of the invention described herein include mechanisms that may implement a platform, language, cloud, and database agnostic research, analytics, and modeling module configured to create one platform for end-to-end modeling for financial applications, thereby automating the development, testing, and productionizing pipeline for business users while managing and maintaining all necessary guardrails from a control standpoint within a computing environment, but the disclosure is not limited thereto. For example, the research, analytics, and modeling module may be configured to create a light-weight wrapper that includes a set of intuitive and self-service analytics and modeling capabilities with simplified deployment workflows requiring low touch technology team interaction without compromising on controls and governance, thereby reducing data latency, providing scalability for large numbers of data consumers, reducing power consumption for the overall system, reducing space consumption for the overall system, reducing management complexity and cost, providing well-defined component interfaces, and allowing independent deployment of components, but the disclosure is not limited thereto.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic research, analytics, and modeling module configured to create one platform for end-to-end modeling for financial applications, thereby automating the development, testing, and productionizing pipeline for business users while managing and maintaining all necessary guardrails from a control standpoint within a computing environment in accordance with an exemplary embodiment. System 100 is generally shown and may include computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, computer system 102 may include, or be included within, any one or more computers, servers, systems, communication networks or cloud environment. Even further, the instructions may be operative in such a cloud-based computing environment.

In a networked deployment, the computer system 102 may operate in the capacity of a server or as a client user computer in a server-client user network environment, a client user computer in a cloud computing environment, or as a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes described herein. In a particular embodiment, the instructions may reside completely, or at least partially, within memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

An additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the research, analytics, and modeling module implemented by the system 100 may be platform, language, database, and cloud agnostic that may allow for consistent easy orchestration and passing of data through various components to output a desired result regardless of platform, browser, language, database, and cloud environment by writing programs accordingly. Since the disclosed process, according to exemplary embodiments, is platform, language, database, browser, and cloud agnostic, the research, analytics, and modeling module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
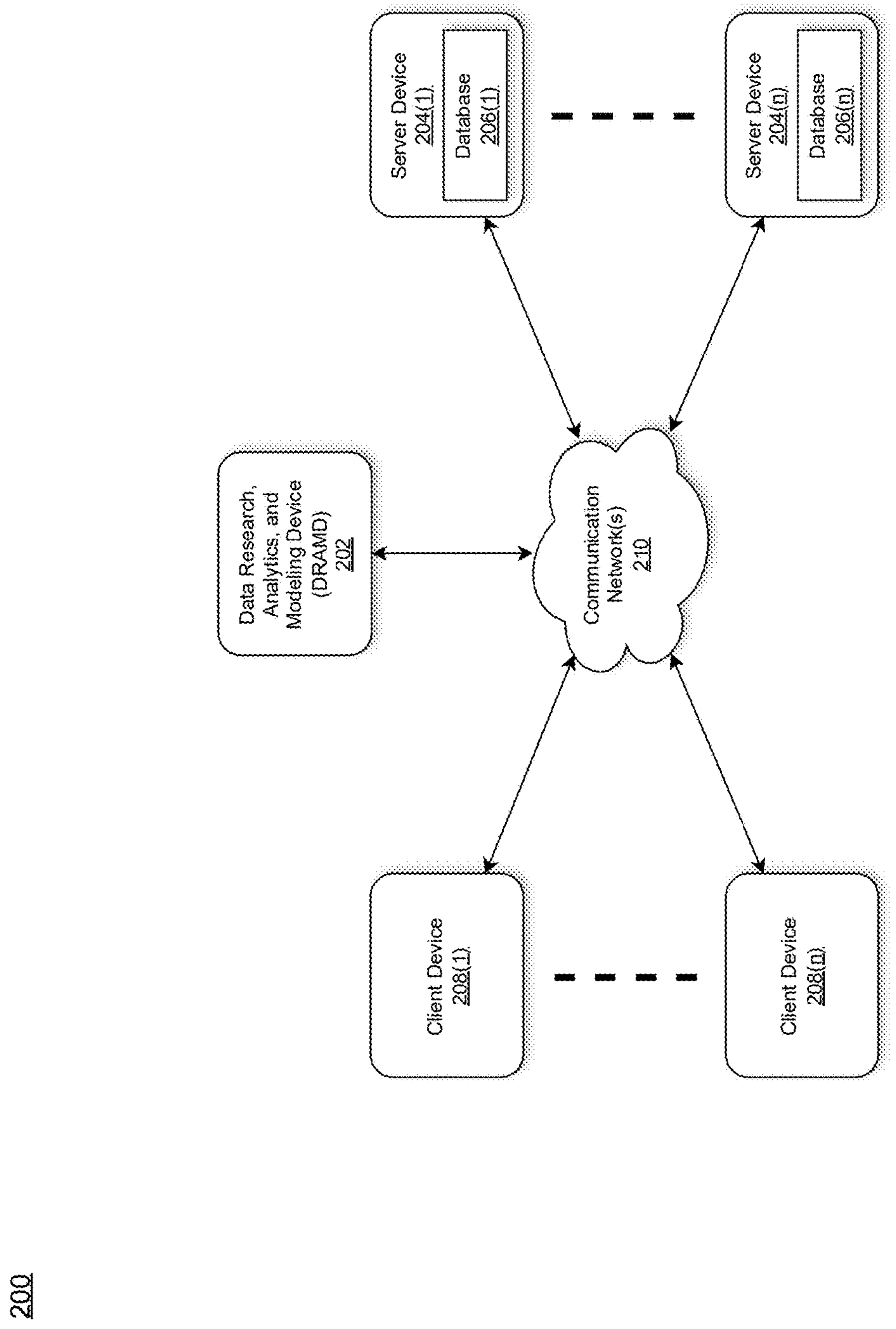
FIG. 2 illustrates an exemplary diagram of a network environment with a platform, language, database, and cloud agnostic research, analytics, and modeling device in accordance with an exemplary embodiment.

Referring to FIG. 2, a schematic of an exemplary network environment 200 for implementing a language, platform, database, and cloud agnostic research, analytics, and modeling device (DRAMD) of the instant disclosure is illustrated.

According to exemplary embodiments, the above-described problems associated with conventional tools may be overcome by implementing an DRAMD 202 as illustrated in FIG. 2 that may be configured for implementing a platform, language, database, and cloud agnostic research, analytics, and modeling module configured to create one platform for end-to-end modeling for financial applications, thereby automating the development, testing, and productionizing pipeline for business users while managing and maintaining all necessary guardrails from a control standpoint, but the disclosure is not limited thereto.

The DRAMD 202 may have one or more computer system 102s, as described with respect to FIG. 1, which in aggregate provide the necessary functions.

The DRAMD 202 may store one or more applications that can include executable instructions that, when executed by the DRAMD 202, cause the DRAMD 202 to perform actions, such as transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DRAMD 202 itself, may be located in virtual server(s) running in a cloud-based computing environment rather than being tied to one or more specific physical network computing devices. Also, the application(s) may be running in one or more virtual machines (VMs) executing on the DRAMD 202. Additionally, in one or more embodiments of this technology, virtual machine(s) running on the DRAMD 202 may be managed or supervised by a hypervisor.

In the network environment 200 of FIG. 2, the DRAMD 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the DRAMD 202, such as the network interface 114 of the computer system 102 of FIG. 1, operatively couples and communicates between the DRAMD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DRAMD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DRAMD 202 may be a standalone device or integrated with one or more other devices or apparatuses, such as one or more of the server devices 204(1)-204(*n*), for example. In one particular example, the DRAMD 202 may be hosted by one of the server devices 204(1)-204(*n*), and other arrangements are also possible. Moreover, one or more of the devices of the DRAMD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the DRAMD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) host databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the DRAMD 202 that may efficiently provide a platform for implementing a platform, language, database, and cloud agnostic research, analytics, and modeling module configured to create one platform for end-to-end modeling for financial applications, thereby automating the development, testing, and productionizing pipeline for business users while managing and maintaining all necessary guardrails from a control standpoint, but the disclosure is not limited thereto.

The client devices 208(1)-208(*n*) may run interface applications, such as standard web browsers or standalone client applications, which may provide an interface to communicate with the DRAMD 202 via the communication network (s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the DRAMD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DRAMD 202, the server devices 204(1)-204(*n*), or the client devices 208(1)-208(*n*), for example, may be configured to operate as virtual instances on the same physical machine. For example, one or more of the DRAMD 202, the server devices 204(1)-204 (*n*), or the client devices 208(1)-208(*n*) may operate on the same physical device rather than as separate devices communicating through communication network(s) 210. Additionally, there may be more or fewer DRAMDs 202, server devices 204(1)-204(*n*), or client devices 208(1)-208(*n*) than illustrated in FIG. 2. According to exemplary embodiments, the DRAMD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
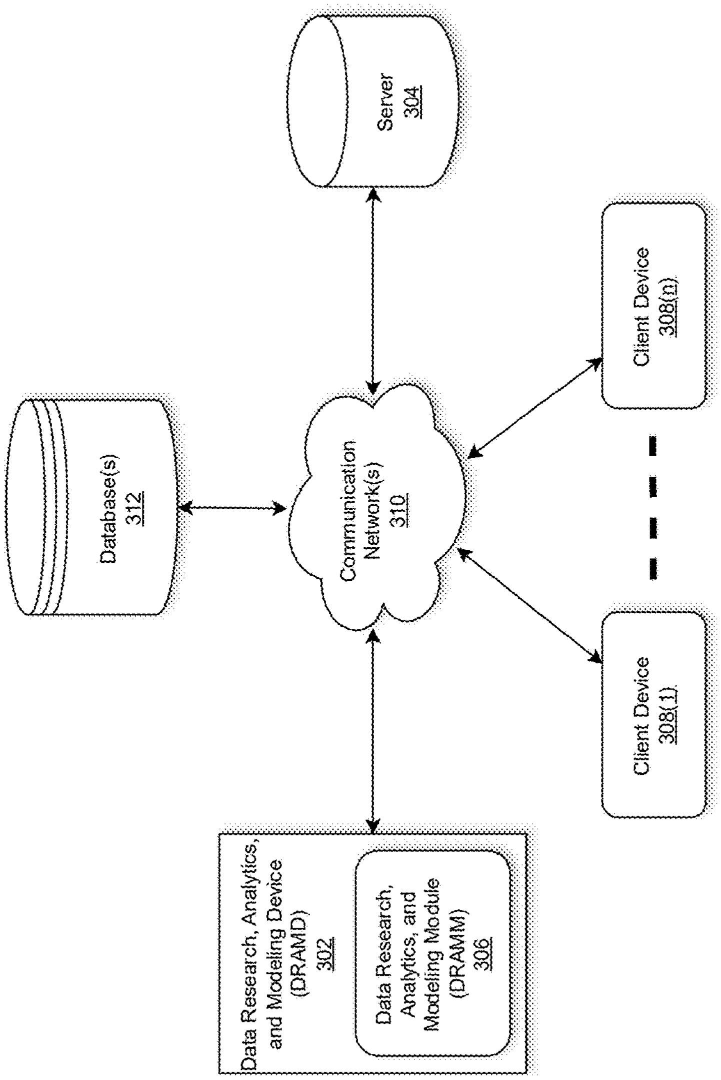
FIG. 3 illustrates a system diagram for implementing a platform, language, database, and cloud agnostic research, analytics, and modeling device having a platform, language, database, and cloud agnostic research, analytics, and modeling module in accordance with an exemplary embodiment.

FIG. 3 illustrates a system diagram for implementing a platform, language, and cloud agnostic DRAMD having a platform, language, database, and cloud agnostic research, analytics, and modeling module (DRAMM) in accordance with an exemplary embodiment.

As illustrated in FIG. 3, the system 300 may include an DRAMD 302 within which an DRAMM 306 is embedded, a server 304, a database(s) 312, a plurality of client devices 308(1) . . . 308(*n*), and a communication network 310.

According to exemplary embodiments, the DRAMD 302 including the DRAMM 306 may be connected to the server 304, and the database(s) 312 via the communication network 310. The DRAMD 302 may also be connected to the plurality of client devices 308(1) . . . 308(*n*) via the communication network 310, but the disclosure is not limited thereto. The database(s) 312 may include rule database.

According to exemplary embodiment, the DRAMD 302 is described and shown in FIG. 3 as including the DRAMM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the DRAMM 306 may be configured to receive real-time feed of data from the plurality of client devices 308(1) . . . 308(*n*) and secondary sources via the communication network 310.

As may be described below, the DRAMM 306 may be configured to: receive a request from a user to access an application, the request including user's credentials data; grant access to the application based on verifying the user's credentials data with prestored credentials data received by calling an authentication server via corresponding application programming interface; identify the user's role within a computing environment; automatically present a template that corresponds to the user's role allowing the user to write code to source data either by bringing the user's own data into the computing environment or by connecting to data that resides in a database; automatically integrate the written code with a continuous integration continuous delivery pipeline for production of a model; and deploy the model after training and testing the model while managing and maintaining all necessary guardrails from a control standpoint within the computing environment, but the disclosure is not limited thereto.

The plurality of client devices 308(1) . . . 308(*n*) are illustrated as being in communication with the DRAMD 302. In this regard, the plurality of client devices 308(1) . . . 308(*n*) may be "clients" (e.g., customers) of the DRAMD 302 and are described herein as such. Nevertheless, it is to be known and understood that the plurality of client devices 308(1) . . . 308(*n*) need not necessarily be "clients" of the DRAMD 302, or any entity described in association therewith herein. Any additional or alternative relationship may exist between either or both of the plurality of client devices 308(1) . . . 308(*n*) and the DRAMD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, server 304 may be the same or equivalent to the server device 204 as illustrated in FIG. 2.

The process may be executed via communication network 310, which may comprise plural networks as described above. For example, in an exemplary embodiment, one or more of the plurality of client devices 308(1) . . . 308(*n*) may communicate with the DRAMD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The DRAMD 302 may be the same or similar to the DRAMD 202 as described with respect to FIG. 2, including any features or combination of features described with respect thereto.

Figure 4:
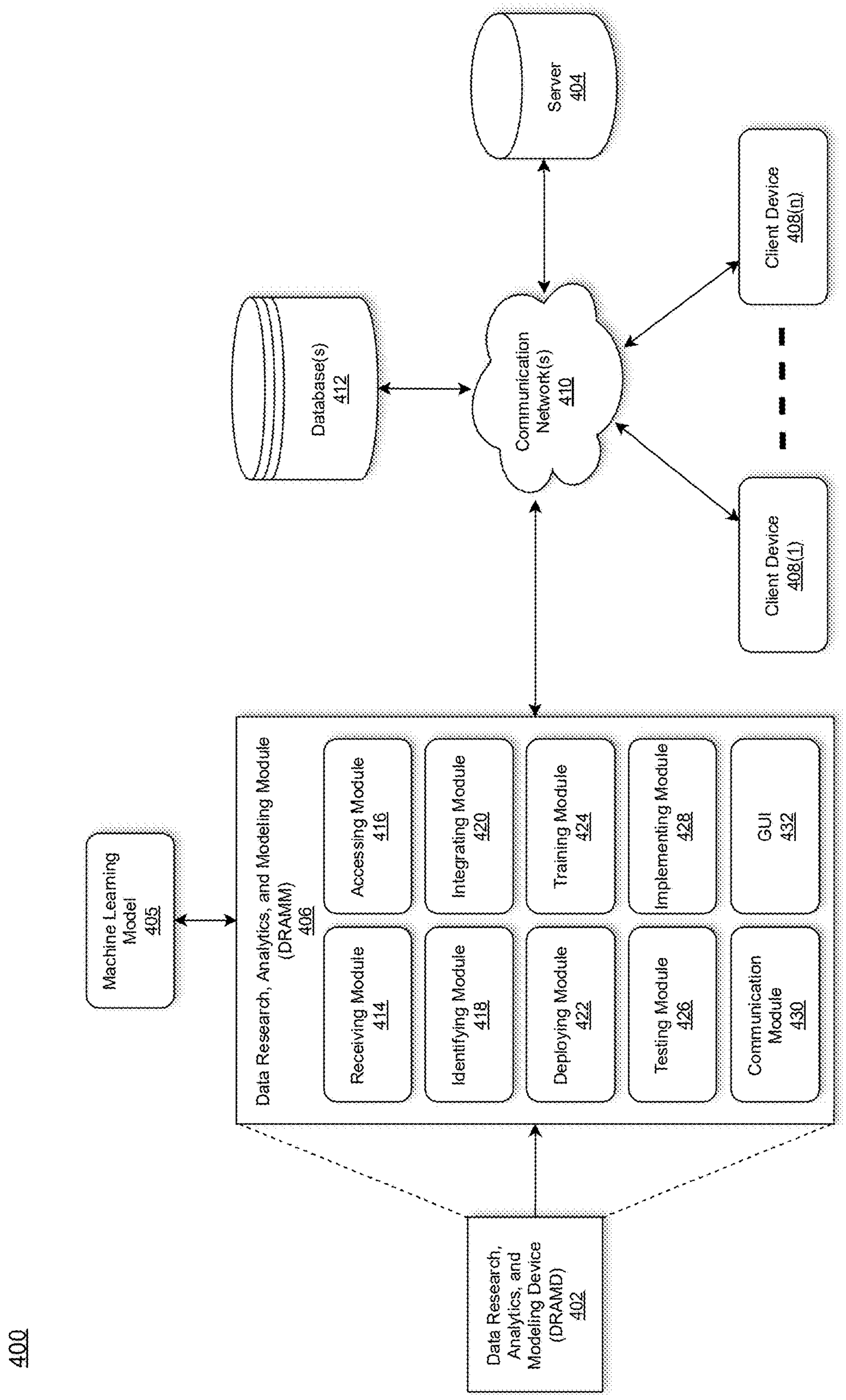
FIG. 4 illustrates a system diagram for implementing a platform, language, database, and cloud agnostic research, analytics, and modeling module of FIG. 3 in accordance with an exemplary embodiment.

FIG. 4 illustrates a system diagram for implementing a platform, language, database, and cloud agnostic DRAMM of FIG. 3 in accordance with an exemplary embodiment.

According to exemplary embodiments, the system 400 may include a platform, language, database, and cloud agnostic DRAMD 402 within which a platform, language, database, and cloud agnostic DRAMM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the DRAMD 402 including the DRAMM 406 may be connected to the server 404, a machine learning model 405, and the database(s) 412 via the communication network 410. The DRAMD 402 may also be connected to the plurality of client devices 408(1)-408(*n*) via the communication network 410, but the disclosure is not limited thereto. The DRAMM 406, the server 404, the plurality of client devices 408(1)-408(*n*), the database(s) 412, the communication network 410 as illustrated in FIG. 4 may be the same or similar to the DRAMM 306, the server 304, the plurality of client devices 308(1)-308(*n*), the database(s) 312, the communication network 310, respectively, as illustrated in FIG. 3.

According to exemplary embodiments, the DRAMM 406 may be configured to implement the machine learning model 405 and create one platform for end-to-end modeling for financial applications, thereby automating the development, testing, and productionizing pipeline for business users while managing and maintaining all necessary guardrails from a control standpoint within a computing environment, but the disclosure is not limited thereto. Therefore, users can instantly gain insight into hallucination probability and revise a query accordingly.

The target personas are data analysts, business developers and statistical modelers, machine learning (ML) engineers and data scientists and finance professionals executing previously built models and queries. Examples of the use cases that the DRAMM 406 simplifies may include the following, but the disclosure is not limited thereto: Data analysis to support business requirements; Statistical analysis or What-if analysis/Ad-hoc analysis; Business validation for "just in time" question; Develop models (ex. Linear models, Statistical Model, Forecast Models) to support Regulatory, Audit, Finance, Strategy and Risk management Processes, etc.

According to exemplary embodiments, the DRAMM 406 may be configured to provide a control framework around core Databricks capabilities and enables the following, but the disclosure is not limited thereto: Simple and seamless onboarding experience; Automation of optimized infrastructure creation with pre-built libraries including but not limited to on demand cluster creation with minimal inputs to provision tailor made compute types that are size optimized; Access to run Python/SQL scripts on production data; Ability to bring or build own dataset; Ability to create simple visualizations and collaborate; Ability to share and catalog models; Self-orchestration and promotion of code to production with controls; Maintenance of granular metadata for full lineage and traceability of user and system actions, etc.

The capabilities provided by the DRAMM 406 are designed and built with reusability in mind and how they can enable multiple business processes where there are commonalities such as data sourcing, model development and execution, process orchestration and data consumption. For example, the following goals are implemented by the DRAMM 406 in achieving the results disclosed herein: 1. "Enable centralized, self-service data sourcing through an array of consumption patterns optimized for Purchase and Assumption (P&A) consumption;" 2. "Deliver a best in class, efficient, and intuitive end to end experience that enables collaboration and model driven forecast generation; 3. "Provide capabilities to produce proactive insights that enable data driven decisions," but the disclosure is not limited thereto.

Future roadmap of the tool includes access to advanced ML libraries and techniques for the ability to train and compare model accuracy and results. Future integrations include model governance, the Databricks Feature Store and Large Language Models.

For example, the DRAMM 406 may include a set of intuitive and self-service analytics and modeling capabilities with simplified deployment workflows requiring low touch technology team interaction. For example, by utilizing the DRAMM 406, a user can perform: self-service registration where the user can register the code with code management systems to ensure controls and versioning; configuration management where the user can configure and customize run execution screen for deployed code; execute code dashboard where the user can execute code in Databricks using production data and output persistence to selected database. The DRAMM 406 can automatically execute the code and generate outputs. The dashboard can be run by the DRAMM 406 to view the run history, outputs and logs in the run's dashboard (i.e., GUI 432 as illustrated in FIG. 4).

Figure 5:
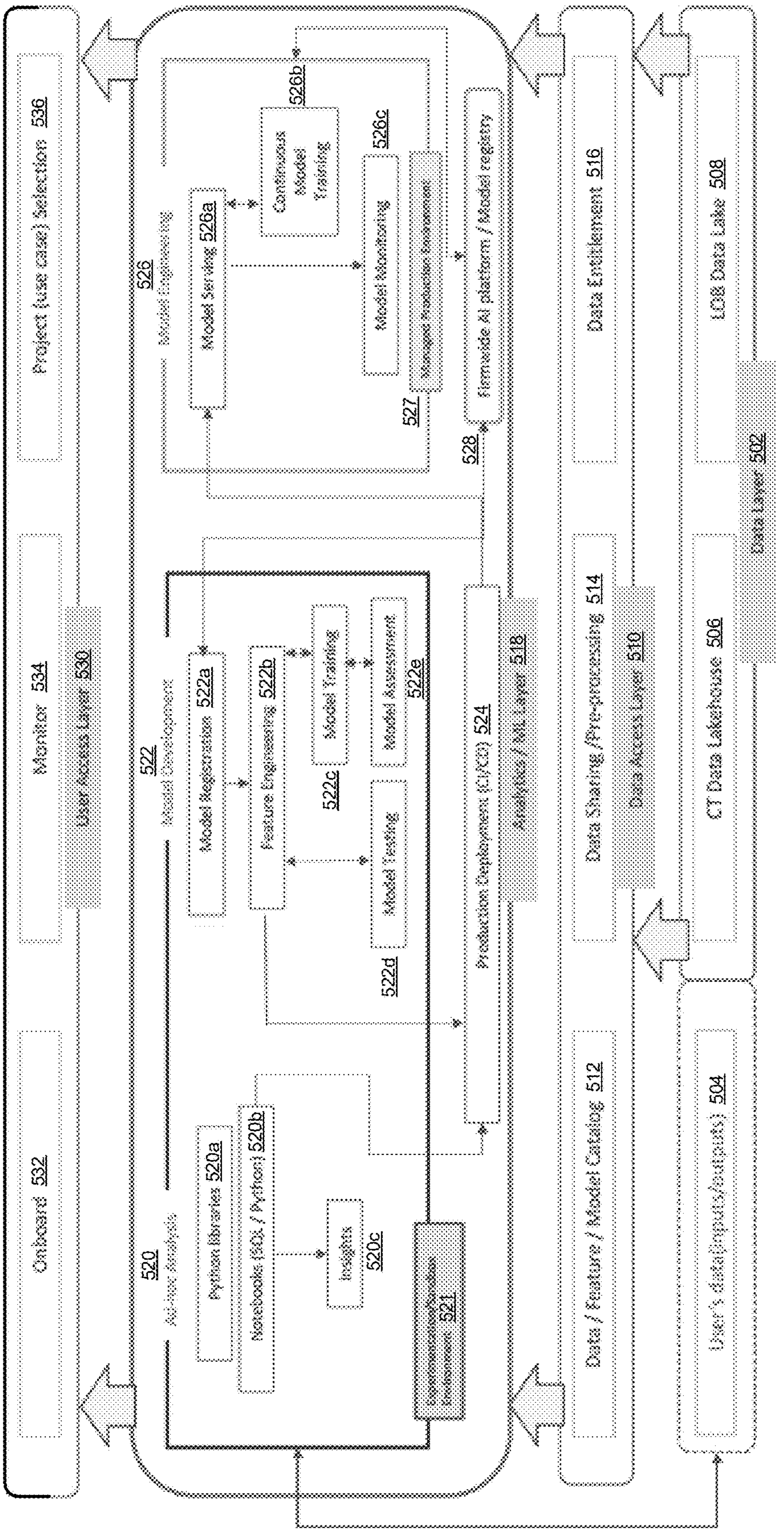
FIG. 5 illustrates an exemplary architecture implemented by the platform, language, database, and cloud agnostic research, analytics, and modeling module of FIG. 4 in accordance with an exemplary embodiment.
Figure 6:
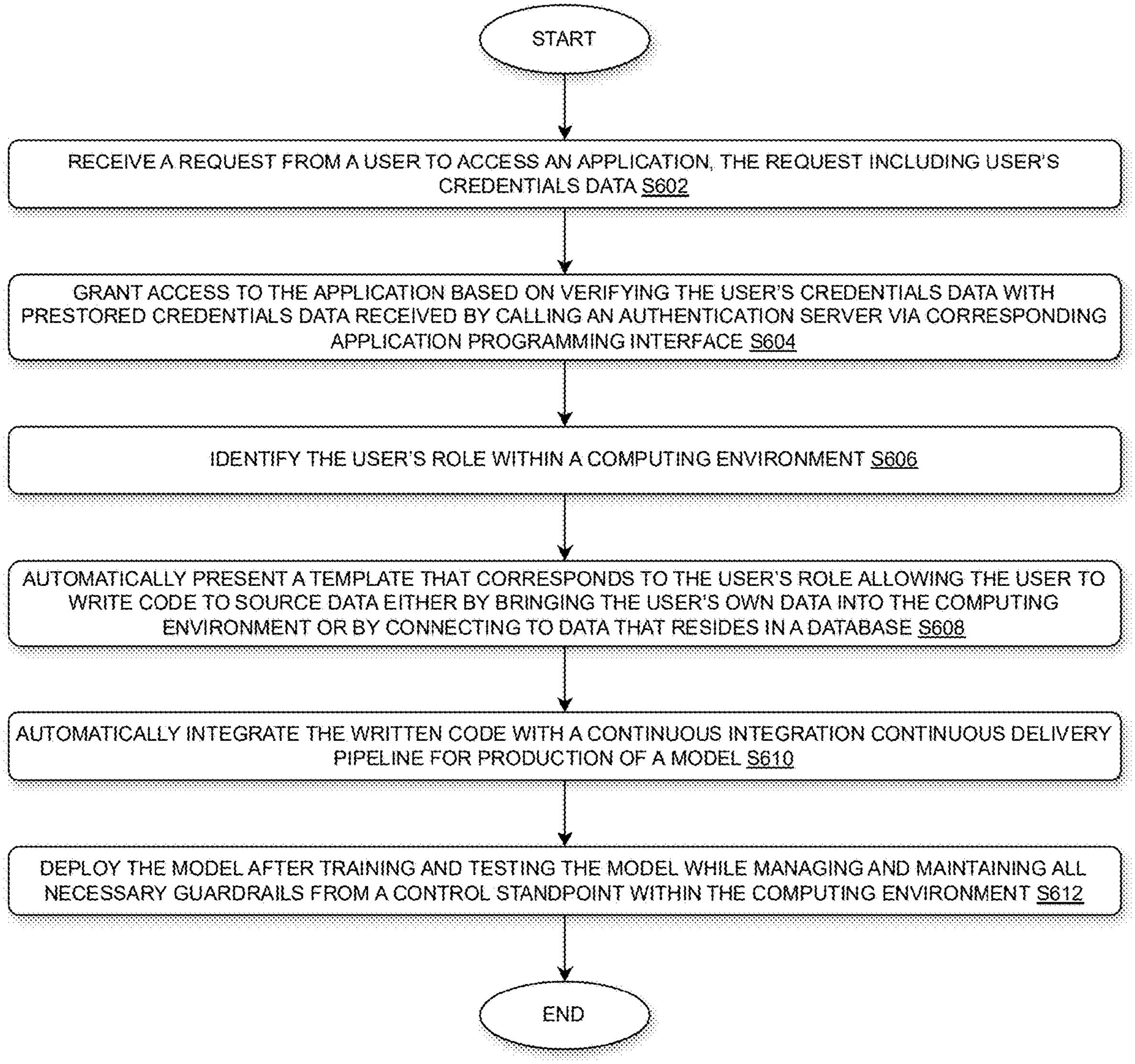
FIG. 6 illustrates an exemplary flow chart of a process implemented by the platform, language, database, and cloud agnostic research, analytics, and modeling module of FIG. 4 for creating one platform for end-to-end modeling for financial applications in accordance with an exemplary embodiment.

Details of the DRAMM 406 is provided below with corresponding modules that may be configured to, in combination, results in create one platform for end-to-end modeling for financial applications, thereby automating the development, testing, and productionizing pipeline for business users while managing and maintaining all necessary guardrails from a control standpoint within a computing environment, as illustrated in FIGS. 4-6

According to exemplary embodiments, as illustrated in FIG. 4, the DRAMM 406 may include a receiving module 414, an accessing module 416, an identifying module 418, an integrating module 420, a deploying module 422, a training module 424, a testing module 426, an implementing module 428, a communication module 430, and a GUI 432. According to exemplary embodiments, interactions and data exchange among these modules included in the DRAMM 406 provide the advantageous effects of the disclosed invention. Functionalities of each module of FIG. 4 may be described in detail below with reference to FIGS. 5-6.

According to exemplary embodiments, each of the receiving module 414, accessing module 416, identifying module 418, integrating module 420, deploying module 422, training module 424, testing module 426, implementing module 428, and the communication module 430 of the DRAMM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, accessing module 416, identifying module 418, integrating module 420, deploying module 422, training module 424, testing module 426, implementing module 428, and the communication module 430 of the DRAMM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, accessing module 416, identifying module 418, integrating module 420, deploying module 422, training module 424, testing module 426, implementing module 428, and the communication module 430 of the DRAMM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the DRAMM 406 of FIG. 4 may also be implemented by Cloud based deployment.

According to exemplary embodiments, each of the receiving module 414, accessing module 416, identifying module 418, integrating module 420, deploying module 422, training module 424, testing module 426, implementing module 428, and the communication module 430 of the DRAMM 406 of FIG. 4 may be called via corresponding Application Programming Interface (API), but the disclosure is not limited thereto. For example, the receiving module 414 may be called via a first API, the accessing module 416 may be called via a second API, the identifying module 418 may be called via a third API, the integrating module 420 may be called via a fourth API, the deploying module 422 may be called via a fifth API, the training module 424 may be called via a sixth API, the testing module 426 may be called via a seventh API, the implementing module 428 may be called via an eighth API, and the communication module 430 may be called via a nineth API.

According to exemplary embodiments, the process implemented by the DRAMM 406 may be executed via calling the communication module 430 via the nineth API and the communication network 410, which may comprise plural networks as described above. For example, in an exemplary embodiment, the various components of the DRAMM 406 may communicate with the server 404, and the database(s) 412 via the communication module 430 and the communication network 410 and the results (i.e., probability value; empirical estimate, etc.) may be displayed onto the GUI 432. Of course, these embodiments are merely exemplary and are not limiting or exhaustive. The database(s) 412 may include the databases included within the private cloud and/or public cloud and the server 404 may include one or more servers within the private cloud and the public cloud.

For example, the DRAMM 406 may be configured to create a light-weight wrapper that includes a set of intuitive and self-service analytics and modeling capabilities with simplified deployment workflows requiring low touch technology team interaction without compromising on controls and governance, but the disclosure is not limited thereto. A wrapper is a function or a subroutine in a software library or a computer program whose main purpose is to call a second subroutine or a system call with little or no additional computation.

According to exemplary embodiments, the wrapper disclosed herein may utilize Databricks as the execution platform to handle end to end modeling for all phases of the model lifecycle that meet any or all of following goals, or any combination thereof: reduced data latency, scalability for large numbers of data/application consumers, reduced power consumption on overall system performance, reduced space consumption on overall system performance, reduced management complexity and cost in application production and deployment; well-defined component interfaces, and independent deployment of components of the DRAMM 406.

Thus, the DRAMM 406 provides a control framework around core Databricks capabilities and enables: simple and seamless onboarding experience; automation of optimized infrastructure creation with pre built libraries including but not limited to on demand cluster creation with minimal inputs to provision tailor made compute types that are size optimized; access to run Python/SQL scripts on production data; ability to bring or build own dataset; ability to create simple visualizations and collaborate; ability to share and catalog models; self-orchestration and promotion of code to production with controls; maintenance of granular metadata for full lineage and traceability of user and system actions, etc., but the disclosure is not limited thereto.

For example, typical orchestration tools may allow users to manually define workflows or plans (i.e., sequence of actions) to execute a task in infrastructure creation. However, there appears to be no automation on automatically building those workflows or plans from received inputs in infrastructure creation. Also, if the workflow has to be adapted to different inputs/outputs, it has to be manually modified to account for other inputs as the ones they were defined for, thereby adding complexity to the overall system or process, failing to resolve data integration or synchronization or transfer issues among various computer implemented tools having various heterogenous systems running therein and subjecting the overall systems to malicious cyber-attacks due to the manual nature of defining tasks. Some conventional orchestration tools may incorporate process mining techniques which may allow users to infer workflows from examples. However, these conventional techniques require examples, and additionally, the users should check for the correctness of the induced workflows. Thus, today's conventional orchestration tools fail to dynamically and automatically compose workflows or plans and execute them. Thus, the DRAMM 406 provides a control framework around core Databricks capabilities and enables, among others, automation of optimized infrastructure creation with pre-built libraries as disclosed herein including but not limited to on demand cluster creation with minimal inputs to provision tailor made compute types that are size optimized.

For example, according to exemplary embodiments, the receiving module 414 may be configured to receive a request from a user to access an application, the request including user's credentials data. The accessing module 416 may be configured to grant access to the application based on verifying the user's credentials data with prestored credentials data received by calling an authentication server (i.e., server 404) via corresponding API.

According to exemplary embodiments, the identifying module 418 may be configured to identify the user's role within a computing environment. The DRAMM 406 then automatically presents a template that corresponds to the user's role allowing the user to write code to source data either by bringing the user's own data into the computing environment or by connecting to data that resides in a database. The integrating module 420 may be configured to automatically integrate the written code with a continuous integration continuous delivery pipeline for production of a model, i.e., machine learning model 405. The deploying module 422 may be configured to deploy the model after training (by utilizing the training module 424) and testing (by utilizing the testing module 426) the model while managing and maintaining all necessary guardrails from a control standpoint within the computing environment.

According to exemplary embodiments, the DRAMM 406 may be configured to dynamically create user interface (i.e., GUI 432) along with user's inputs.

According to exemplary embodiments, the user's role may include one or more of the following: data analysts, business developer, statistical modeler, machine learning engineer, data scientist, but the disclosure is not limited thereto.

According to exemplary embodiments, the computing environment may be a combination of a public cloud environment and a private cloud environment. Alternatively, the computing environment may be a public cloud environment or a private cloud environment.

According to exemplary embodiments, the implementing module 428 may be configured to implement the model to support regulatory, audit, finance, strategy, and risk management processes.

According to exemplary embodiments, the receiving module 414 may be further configured to receive user inputs to configure and customize run execution screen for deployed code.

FIG. 5 illustrates an exemplary architecture 500 implemented by the DRAMM 406 of FIG. 4 in accordance with an exemplary embodiment. As illustrated in FIG. 5, the exemplary architecture 500 may include a data layer 502, data access layer 510, analytics/ML layer 518, and user access layer 530.

According to exemplary embodiments, the data layer 502 may be implemented by the DRAMM 406 for user's data (inputs/outputs) 504, data Lakehouse 506 (i.e., database), and LOB data lake 508. Data from the data layer 502 may flow to the data access layer 510.

According to exemplary embodiments, the data access layer 510 may be implemented by the DRAMM 406 for data/feature/model catalog 512, data sharing/pre-processing 514, and data entitlement 516. Data from the data access layer 510 may flow to the analytics/ML layer 518.

According to exemplary embodiments, the analytics/ML layer 518 may provide ad-hoc analysis 520, model development 522, model engineering 526, experimentation/sandbox environment 521, production deployment (CI/CD) 524 pipeline; Artificial Intelligence platform/model registry 528. Within ad-hoc analysis 520, a user may access to Python libraries 520*a*, notebooks (SQL/Python) 520*b* to provide insights 520*c*.

The model development 522 section may be utilized for model registration 522*a*, feature engineering 522*b*, model training 522*c*, model testing 522*d*, and model assessment 522*e*. The model engineering 526 section may be utilized for model serving 526*a*, continuous model training 526*b*, model monitoring 526*c*, which in combination may be referred to as managed production environment 527.

According to exemplary embodiments, data from the analytics/ML layer 518 may flow to the user access layer 530 for the user to onboard 532, monitor 534, and project selection 536.

For example, the DRAMM 406 may include an analytical capabilities component, a data mesh component, an application services component, and other services component. According to exemplary embodiments, the analytical capabilities component to provide services via sandbox, i.e., SQL analytics, notebook development, ML feature development; and managed execution for clusters, notebooks, jobs, etc., and model training/servicing, i.e., feature models, feature tables, etc.

According to exemplary embodiments, the data mesh component by be utilized for receiving user data, i.e., inputs, outputs; and published data products, i.e., Finance Lakehouse, FAA Lakehouse, AWM Finance Lakehouse, etc.

According to exemplary embodiments, the application services component may be utilized for onboarding—User onboarding, Use case registration, Group entitlements, etc.; data—User Uploads; Catalog services; Data Extracts, etc.; infrastructure—cluster management, template set ups; finops, etc.; execution—Run Management; Process Orchestration; Notification, etc.; metadata—Model Inventory (LOB), Version, run time parameters, Audit history and lineage, etc.; and Software Development Life Cycle (SDLC)—source control integration; JavaScript Extension Toolkit (JET) integration, DBX Databricks integration, etc., but the disclosure is not limited thereto. DBX by Databricks is an open source tool which is designed to extend the legacy Databricks command-line interface (Databricks CLI) and to provide functionality for rapid development lifecycle and continuous integration and continuous delivery/deployment (CI/CD) on the Databricks platform.

According to exemplary embodiments, the other services component may provide support for infinite AI and entitlements.

According to exemplary embodiments, data governance implemented by the DRAMM 406 may include the following, but the disclosure is not limited thereto.

1) SID level traceability include (but not limited to) capture data upload operations, platform usage metadata, usage attestation—for audits and lineage.
2) Experimentation catalog is open for writes for SID having appropriate entitlements. Reads from Production are also governed by entitlements.
3) Application entitlements implemented—Access to production data controlled through entitlements.
4) Quarterly purge of data on experimentation space to curb usage of generated insights in experimentation for regulatory reporting and business decisions.
5) Production tables are hydrated by approved models and/or through Everest ingestion pipelines.

According to exemplary embodiments, the model governance may include the following, but the disclosure is not limited thereto.

1) Guidance: Use experimentation workspace for model development and ad-hoc analysis and/or as a sandbox. Models are to be deployed to production if their outputs are used for regulatory reporting or critical business decisions.
2) Environment Usage Guidance:

SANDBOX (Experimentation Workspace)-Analytics, Model Development, Sandbox.

TRAIN (Experimentation Workspace): Perform Draft Deployments, Test and Train Models and secure sign offs.

SERVING (Managed Production): Live Model Serving and Execution environment. Outputs into production environment.

FIG. 6 illustrates an exemplary flow chart of a process 600 implemented by the platform, language, database, and cloud agnostic DRAMM 406 of FIG. 4 for automating development, testing, and productionizing pipeline for users in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include receiving, by calling the receiving module 414 via the first API as mentioned earlier with respect to FIG. 4, a request from a user to access an application, the request including user's credentials data.

At step S604, the process 600 may include granting access, by calling the accessing module 416 via the second API as mentioned earlier with respect to FIG. 4, to the application based on verifying the user's credentials data with prestored credentials data received by calling an authentication server via corresponding application programming interface.

At step S606, the process 600 may include identifying, by calling the identifying module 418 via the third API as mentioned earlier with respect to FIG. 4, the user's role within a computing environment.

At step S608, the process 600 may include automatically presenting a template on the GUI 432 as illustrated in FIG. 4 that corresponds to the user's role allowing the user to write code to source data either by bringing the user's own data into the computing environment or by connecting to data that resides in a database.

At step S610, the process 600 may include automatically integrating, by calling the integrating module 420 via the fourth API as mentioned earlier with respect to FIG. 4, the written code with a continuous integration continuous delivery pipeline for production of a model.

At step S612, the process 600 may include deploying, by calling the deploying module 422 via the fifth API as mentioned earlier with respect to FIG. 4, the model after training, by calling the training module 424 via the sixth API as mentioned earlier with respect to FIG. 4, and testing the model, by calling the testing module 426 via the seventh API as mentioned earlier with respect to FIG. 4, while managing and maintaining all necessary guardrails from a control standpoint within the computing environment.

According to exemplary embodiments, the process 600 may further include: dynamically creating, by utilizing the DRAMM 406 of FIG. 4 as mentioned earlier, user interface along with user's inputs.

According to exemplary embodiments, in the process 600, the user's role may include one or more of the following: data analysts, business developer, statistical modeler, machine learning engineer, data scientist, but the disclosure is not limited thereto.

According to exemplary embodiments, in the process 600, the computing environment may be a combination of a public cloud environment and a private cloud environment.

According to exemplary embodiments, the process 600 may further include: implementing the model, by calling the implementing module 428 via the eighth API as mentioned earlier with respect to FIG. 4, to support regulatory, audit, finance, strategy, and risk management processes.

According to exemplary embodiments, the process 600 may further include: receiving user inputs, by calling the receiving module 414 via the first API as mentioned earlier with respect to FIG. 4, to configure and customize run execution screen for deployed code.

According to exemplary embodiments, in the process 600, the model may be a machine learning model. The machine learning model may be the same or similar to the machine learning model 405 as discussed earlier with respect to FIG. 4. Additionally, the machine learning model may be categorized by its learning approach: supervised (predicting outputs from labeled data), unsupervised (finding patterns in unlabeled data), and reinforcement learning (learning through rewards and penalties).

According to exemplary embodiments, the DRAMD 402 may include a memory (e.g., a memory 106 as illustrated in FIG. 1) which may be a non-transitory computer readable medium that may be configured to store instructions for implementing a platform, language, database, and cloud agnostic DRAMM 406 for automating development, testing, and productionizing pipeline for users as disclosed herein. The DRAMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DRAMM 406 or within the DRAMD 402, may be used to perform one or more of the methods and processes as described herein. In a particular embodiment, the instructions may reside completely, or at least partially, within the memory 106, the medium reader 112, and/or the processor 104 (see FIG. 1) during execution by the DRAMD 402.

According to exemplary embodiments, the instructions, when executed, may cause a processor embedded within the DRAMM 406 or the DRAMD 402 to perform the following: receiving a request from a user to access an application, the request including user's credentials data; granting access to the application based on verifying the user's credentials data with prestored credentials data received by calling an authentication server via corresponding application programming interface; identifying the user's role within a computing environment; automatically presenting a template that corresponds to the user's role allowing the user to write code to source data either by bringing the user's own data into the computing environment or by connecting to data that resides in a database; automatically integrating the written code with a continuous integration continuous delivery pipeline for production of a model; and deploying the model after training and testing the model while managing and maintaining all necessary guardrails from a control standpoint within the computing environment. According to exemplary embodiments, the processor may be the same or similar to the processor 104 as illustrated in FIG. 1 or the processor embedded within the DRAMD 202, DRAMD 302, DRAMD 402, and DRAMM 406 which is the same or similar to the processor 104.

According to exemplary embodiments, the instructions, when executed, may cause the processor 104 to further perform the following: dynamically creating user interface along with user's inputs. According to exemplary embodiments, the user's role may include one or more of the following: data analysts, business developer, statistical modeler, machine learning engineer, data scientist, but the disclosure is not limited thereto. And the computing environment may be a combination of a public cloud environment and a private cloud environment.

According to exemplary embodiments, the instructions, when executed, may cause the processor 104 to further perform the following: implementing the model to support regulatory, audit, finance, strategy, and risk management processes.

According to exemplary embodiments, the instructions, when executed, may cause the processor 104 to further perform the following: receiving user inputs to configure and customize run execution screen for deployed code.

According to exemplary embodiments, the model implemented by the processor 104 may be a machine learning model.

According to exemplary embodiments as disclosed above in FIGS. 1-6, technical improvements effected by the instant disclosure may include a platform for implementing a platform, language, database, and cloud agnostic research, analytics, and modeling module configured to create one platform for end-to-end modeling for financial applications, thereby automating the development, testing, and productionizing pipeline for business users while managing and maintaining all necessary guardrails from a control standpoint, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automating development, testing, and productionizing a pipeline for users by utilizing one or more processors along with allocated memory, the method comprising:

receiving a request from a user to access an application, the request including user's credentials data;

granting access to the application based on verifying the user's credentials data with prestored credentials data received by calling an authentication server via corresponding application programming interface;

identifying user's role within a computing environment;

automatically presenting a template that corresponds to the user's role allowing the user to write code to source data either by bringing user's own data into the computing environment or by connecting to data that resides in a database;

automatically integrating the code written by the user with a continuous integration continuous delivery pipeline for production of a model; and deploying the model after training and testing the model while managing and maintaining all necessary guardrails from a control standpoint within the computing environment.

2. The method according to claim 1, further comprising:

dynamically creating user interface along with user's inputs.

3. The method according to claim 1, wherein the user's role includes one or more of the following: data analysts, business developer, statistical modeler, machine learning engineer, data scientist.

4. The method according to claim 1, wherein the computing environment is a combination of a public cloud environment and a private cloud environment.

5. The method according to claim 1, further comprising:

implementing the model to support regulatory, audit, finance, strategy, and risk management processes.

6. The method according to claim 1, further comprising:

receiving user inputs to configure and customize run execution screen for deployed code.

7. The method according to claim 1, wherein the model is a machine learning model.

8. A system for automating development, testing, and productionizing a pipeline for users, the system comprising:

a processor; and a memory operatively connected to the processor via a communication interface, the memory storing computer readable instructions, when executed, causes the processor to:

receive a request from a user to access an application, the request including user's credentials data;

grant access to the application based on verifying the user's credentials data with prestored credentials data received by calling an authentication server via corresponding application programming interface;

identify user's role within a computing environment;

automatically present a template that corresponds to the user's role allowing the user to write code to source data either by bringing user's own data into the computing environment or by connecting to data that resides in a database;

automatically integrate the code written by the user with a continuous integration continuous delivery pipeline for production of a model; and deploy the model after training and testing the model while managing and maintaining all necessary guardrails from a control standpoint within the computing environment.

9. The system according to claim 8, wherein the processor is further configured to:

dynamically create user interface along with user's inputs.

10. The system according to claim 8, wherein the user's role includes one or more of the following: data analysts, business developer, statistical modeler, machine learning engineer, data scientist.

11. The system according to claim 8, wherein the computing environment is a combination of a public cloud environment and a private cloud environment.

12. The system according to claim 8, wherein the processor is further configured to:

implement the model to support regulatory, audit, finance, strategy, and risk management processes.

13. The system according to claim 8, wherein the processor is further configured to:

receive user inputs to configure and customize run execution screen for deployed code.

14. The system according to claim 8, wherein the model is a machine learning model.

15. A non-transitory computer readable medium configured to store instructions for automating development, testing, and productionizing a pipeline for users, the instructions, when executed, cause a processor to perform the following:

receiving a request from a user to access an application, the request including user's credentials data;

granting access to the application based on verifying the user's credentials data with prestored credentials data received by calling an authentication server via corresponding application programming interface;

identifying user's role within a computing environment;

automatically presenting a template that corresponds to the user's role allowing the user to write code to source data either by bringing user's own data into the computing environment or by connecting to data that resides in a database;

automatically integrating the code written by the user with a continuous integration continuous delivery pipeline for production of a model; and deploying the model after training and testing the model while managing and maintaining all necessary guardrails from a control standpoint within the computing environment.

16. The non-transitory computer readable medium according to claim 15, wherein the instructions, when executed, cause the processor to further perform the following:

dynamically creating user interface along with user's inputs.

17. The non-transitory computer readable medium according to claim 15, wherein the user's role includes one or more of the following: data analysts, business developer, statistical modeler, machine learning engineer, data scientist, and wherein the computing environment is a combination of a public cloud environment and a private cloud environment.

18. The non-transitory computer readable medium according to claim 15, wherein the instructions, when executed, cause the processor to further perform the following:

implementing the model to support regulatory, audit, finance, strategy, and risk management processes.

19. The non-transitory computer readable medium according to claim 15, wherein the instructions, when executed, cause the processor to further perform the following:

receiving user inputs to configure and customize run execution screen for deployed code.

20. The non-transitory computer readable medium according to claim 15, wherein the model is a machine learning model.

* * * * *